US012714214B2

(12) United States Patent
Waldmann et al.

(10) Patent No.: US 12,714,214 B2
(45) Date of Patent: Aug. 25, 2026

(54) HANDBAG CLASP

(71) Applicant: D. W. Developpement SA, Aigle (CH)

(72) Inventors: Daniel Waldmann, Aigle (CH); Patrick Burnens, Aigle (CH)

(73) Assignee: D. W. Developpement SA, Aigle (CH)

( * ) Notice: Subject to any disclaimer, the term of this patent is extended or adjusted under 35 U.S.C. 154(b) by 244 days.

(21) Appl. No.: 18/546,361

(22) PCT Filed: Feb. 9, 2022

(86) PCT No.: PCT/EP2022/053094

§ 371 (c)(1),
(2) Date: Aug. 14, 2023

(87) PCT Pub. No.: WO2022/171655

PCT Pub. Date: Aug. 18, 2022

(65) Prior Publication Data

US 2024/0115021 A1 Apr. 11, 2024

(30) Foreign Application Priority Data

Feb. 15, 2021 (EP) .................................... 21157060

(51) Int. Cl.
*A45C 13/10* (2006.01)
*E05B 65/50* (2006.01)
*E05B 65/52* (2006.01)

(52) U.S. Cl.
CPC .............. *A45C 13/10* (2013.01); *E05B 65/50* (2013.01); *E05B 65/52* (2013.01)

(58) Field of Classification Search
CPC .......... E05B 65/52; E05B 65/50; E05B 65/48; E05B 65/5246; E05B 65/5269; E05B 65/5276; Y10S 292/50
See application file for complete search history.

(56) References Cited

U.S. PATENT DOCUMENTS 821,318 A * 5/1906 Slattery ............... E05B 65/0007 292/213
1,410,995 A * 3/1922 Casperson .............. E05B 65/50 70/76

(Continued)

FOREIGN PATENT DOCUMENTS

FR 706546 A * 6/1931
FR 889770 A * 1/1944

(Continued)

*Primary Examiner* — Christine M Mills
*Assistant Examiner* — Faria F Ahmad
(74) *Attorney, Agent, or Firm* — Dinsmore & Shohl LLP

(57) ABSTRACT

The present invention relates to a handbag clasp (1) comprising a first clasping element (2) provided on either one of a handbag flap (21) and a handbag body (31) and a second clasping element (3) provided on the other one of the handbag flap (21) and the handbag body (31) and adapted to collaborate together to lock/unlock the handbag clasp (1) in order to permit closing/opening of the handbag, wherein the first clasping element (1) comprises a first fixed part (22) and a mobile part (23), the first fixed part (22) comprising a first abutting portion (25) and the mobile part (23) presenting a second abutting portion (28) and being hingedly fixed to the first fixed part (22) so as to be moved between a first unlocking position and a second locking position, the second clasping element (3) comprises a second fixed part (32) and a locking element (33) providing a recess (35) between them, wherein the recess is adapted to receive the first abutting portion and presents a third abutting portion adapted to come in contact with the first abutting portion (25) when the mobile part (23) is positioned in the locking position, and the locking element (33) presenting a fourth abutting portion adapted to be in contact with the second abutting portion when the mobile part is positioned in the locking portion, characterized in that the contact zone (50) between the first abutting portion and the third abutting (Continued)

portion is transversal to the contact zone (51) between the second abutting portion and the fourth abutting portion.

13 Claims, 2 Drawing Sheets

(56) References Cited

U.S. PATENT DOCUMENTS

| | | | | | | |
|---|---|---|---|---|---|---|
| 1,411,314 | A | * | 4/1922 | Thompson | E05B 65/50 | 70/9 |
| 1,482,875 | A | * | 2/1924 | Walker | E05B 65/50 | 292/249 |
| 1,489,815 | A | * | 4/1924 | Brosin | E05B 65/50 | 70/358 |
| 1,654,079 | A | * | 12/1927 | Hiering | E05B 65/50 | 70/10 |
| 1,726,162 | A | * | 8/1929 | Pique | E05B 65/48 | 292/341.19 |
| 1,841,334 | A | * | 1/1932 | Long | E05B 65/50 | 70/74 |
| 1,892,289 | A | * | 12/1932 | Stone | E05B 65/50 | 70/74 |
| 1,945,268 | A | * | 1/1934 | Fielding | A45C 13/10 | 63/3 |
| 2,279,757 | A | * | 4/1942 | Magnuson | E05B 65/52 | 292/281 |
| 2,300,509 | A | * | 11/1942 | Komenak | E05B 65/50 | 70/76 |
| 2,314,180 | A | * | 3/1943 | Thiele | E05B 65/50 | 292/228 |
| 2,382,756 | A | * | 8/1945 | Wagner | E05B 65/50 | 70/75 |
| 2,651,536 | A | * | 9/1953 | Doquier | E05B 65/50 | 70/448 |
| 2,672,040 | A | * | 3/1954 | Komenak | E05B 65/50 | 70/76 |
| 2,684,863 | A | * | 7/1954 | Clausen | E05B 65/50 | 292/283 |
| 2,819,604 | A | * | 1/1958 | Abraham | E05B 65/50 | 292/254 |
| 3,125,874 | A | * | 3/1964 | Gehrie | E05B 65/50 | 190/28 |
| 3,186,198 | A | * | 6/1965 | Noerrenberg-Sudhaus | E05B 65/50 | 70/67 |
| 4,286,814 | A | * | 9/1981 | Harrington | E05B 65/48 | 292/281 |
| 4,627,650 | A | * | 12/1986 | Hauschulte | E05C 19/14 | 292/113 |
| 5,199,138 | A | * | 4/1993 | Morita | A41F 1/002 | 24/303 |
| 5,331,723 | A | * | 7/1994 | Mathieu | A44C 5/24 | 24/69 J |
| 2014/0251999 | A1 | * | 9/2014 | Ely | E05B 65/5276 | 292/256 |

FOREIGN PATENT DOCUMENTS

| | | | | | |
|---|---|---|---|---|---|
| FR | 1327609 | A | * | 5/1963 | E05B 65/50 |
| FR | 2565080 | A1 | | 12/1985 | |
| GB | 213862 | A | * | 4/1924 | E05B 65/50 |
| GB | 300020 | A | * | 11/1928 | E05B 65/50 |
| GB | 300151 | A | * | 11/1928 | E05B 65/50 |
| GB | 307594 | A | * | 3/1929 | E05B 65/50 |
| GB | 357965 | A | * | 9/1931 | E05B 65/50 |
| GB | 771917 | A | * | 4/1957 | E05B 65/50 |

* cited by examiner

HANDBAG CLASP

CROSS REFERENCE TO RELATED APPLICATIONS

This application is a U.S. National Stage of international application number PCT/EP2022/053094 filed Feb. 9, 2022, which depends from and claims priority to European Application No: 21157060.1 filed Feb. 15, 2021, the entire contents of which are incorporated herein by reference.

TECHNICAL FIELD

The present invention relates to handbag locking mechanism and more particularly to handbag clasp and even more preferably for handbag clasp adapted to attach a handbag flap with a handbag body.

BACKGROUND OF THE ART

Receptacles such as, luggage of all types, bags, receptacles, purses and the like have gained widespread usage. In order to permit locking of theses bags, they have been provided with a plurality of different clasping means which differ from the technology employed. Basically, the conventional claps are however all made of two different elements which are each fixed to the two portions of the bag to be attached to each other and adapted to collaborate together to provide locking of the bag.

Handbags found in the prior art, are typically not designed to permit a reliable and easy locking process for attaching the flap to the body. For example, most common clasps consist in magnetic clips, complicated kex/lock systems, barrel system and the same which is addition to be technically complicated do implement, do not provide any easy flap handling means.

There is therefore a need for such a handbag flap locking system being easy to manipulate.

In this regard, a primary object of the invention is to solve the above-mentioned problems and more particularly to provide a handbag clasp permitting a reliable and easy handbag locking process.

SUMMARY OF THE INVENTION

The above problems are solved by the present invention.

A first aspect of the invention is a handbag clasp comprising a first clasping element provided on either one of a handbag flap and a handbag body and a second clasping element provided on the other one of the handbag flap and the handbag body and adapted to collaborate together to lock/unlock the handbag clasp in order to permit closing/opening of the handbag, wherein, the first clasping element comprises a first fixed part and a mobile part, the first fixed part comprising a first abutting portion and the mobile part presenting a second abutting portion and being hingedly fixed to the first fixed part so as to be moved between a first unlocking position and a second locking position, the second clasping element comprises a second fixed part and a locking element providing a recess between them, wherein the recess is adapted to receive the first abutting portion and presents a third abutting portion adapted to come in contact with the first abutting portion when the mobile part is positioned in the locking portion, and the locking element presenting a fourth abutting portion adapted to be in contact with the second abutting portion when the mobile part is positioned in the locking portion, characterized in that the contact zone between the first abutting portion and the third abutting portion is transversal to the contact zone between the second abutting portion and the fourth abutting portion.

According to a preferred embodiment of the present invention, the contact zone between the first abutting portion and the second abutting portion is perpendicular to the contact zone between the third abutting portion and the fourth abutting portion.

Advantageously, one of the second fixed part and the mobile part comprises at least protrusion and the other one of the second fixed part and the mobile part comprises at least one recess positioned such that upon locking position the at least one protrusion is adapted to be received in said at least one recess.

Preferably, the first fixed part and mobile part presents a predetermined inner radial shape, and the locking element presents in outer radial shape fitting said predetermined inner radial shape.

According to a preferred embodiment of the present invention, the predetermined inner radial shape is a circle.

Advantageously, the mobile part is hingedly fixed to the first fixed part so as to be rotated between a first unlocking position and a second locking position along a rotation axis transversal to the flapping direction.

Preferably, the second fixed part and a locking element are a monobloc element.

According to a preferred embodiment of the present invention, the first abutting portion corresponds to the surface of a tongue portion located on the lower edge of the first fixed portion which faces away the bag.

Advantageously, the second abutting portion corresponds to the inner radial surface of the mobile part.

Preferably, the third abutting portion corresponds to the rear side facing the fixed part of the locking portion.

According to a preferred embodiment of the present invention, the fourth abutting portion corresponds to the outer radial surface of the locking portion.

Advantageously, the handbag clasp further comprises an elastic locking means provided on one of the locking elements and the mobile part, said locking means having the form of pin mounted on a spring inside the locking element or the mobile part so as to slightly exceed from its radial surface and a corresponding recess for receiving said pin when in locked position on the other one of the locking element and the mobile part.

According to a preferred embodiment of the present invention, the pin has a chamfered shape.

BRIEF DESCRIPTION OF THE DRAWINGS

Further particular advantages and features of the invention will become more apparent from the following non-limitative description of at least one embodiment of the invention which will refer to the accompanying drawings, wherein.

DETAILED DESCRIPTION OF THE INVENTION

The present detailed description is intended to illustrate the invention in a non-limitative manner since any feature of an embodiment may be combined with any other feature of a different embodiment in an advantageous manner.

The present invention relates to a handbag clasp adapted to lock/unlock a handbag flap 21 to a handbag body 31 thereby permitting closing/opening of the handbag.

Figure 1A:
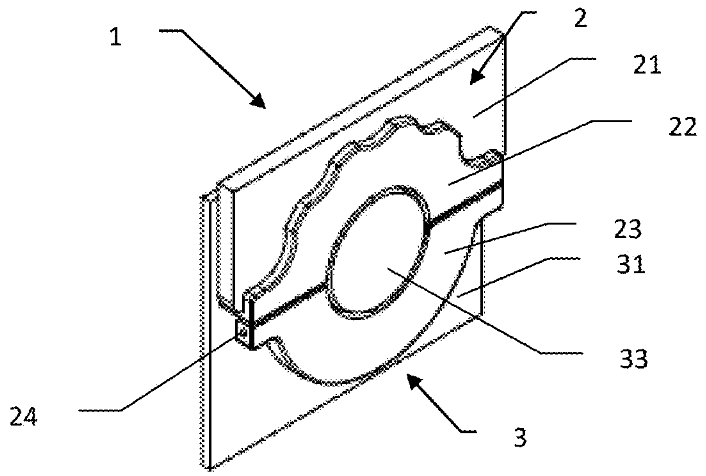
FIGS. 1*a* to 1*c* represents isometric views of a preferred embodiment of the invention in three different positions.
Figure 1B:
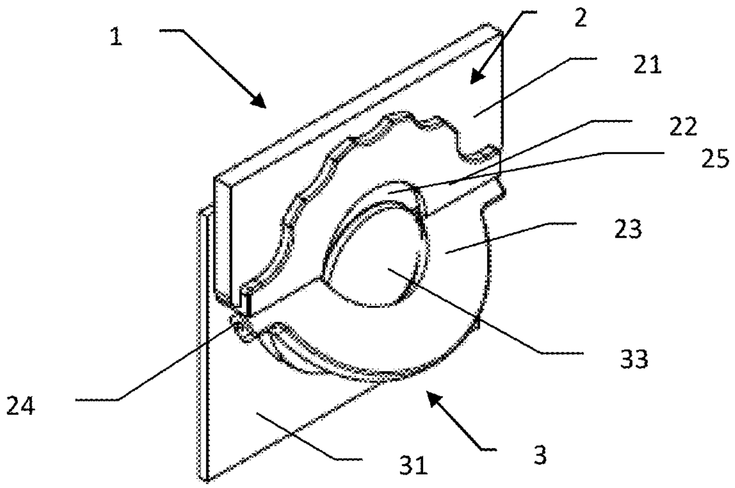
Figure 1C:
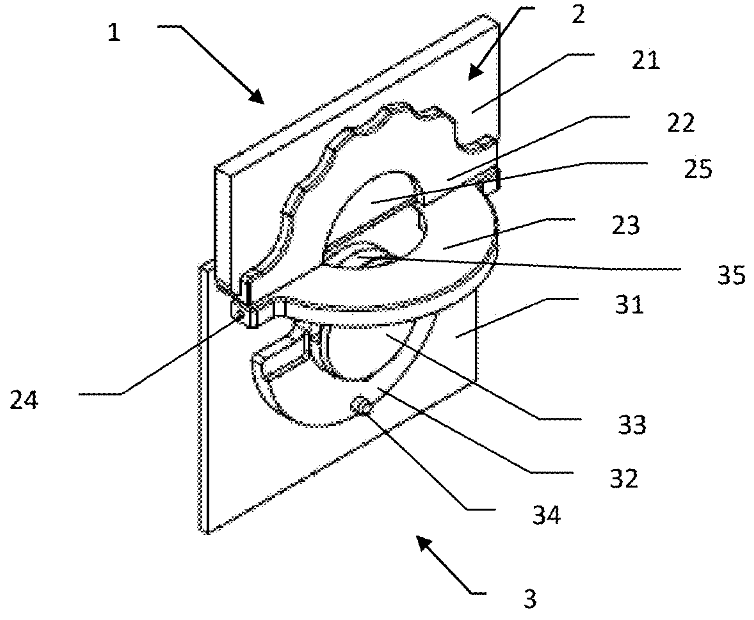
Figure 2:
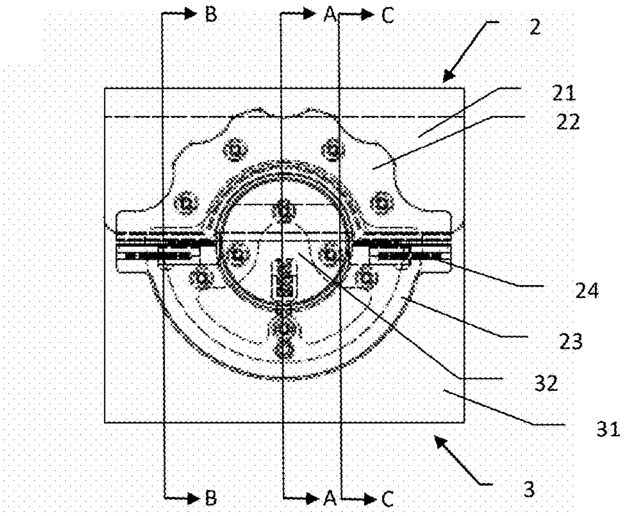
FIG. 2 represents a face view of a preferred embodiment of the invention in closed position with some transparency for representing the rear elements.
Figure 3A:
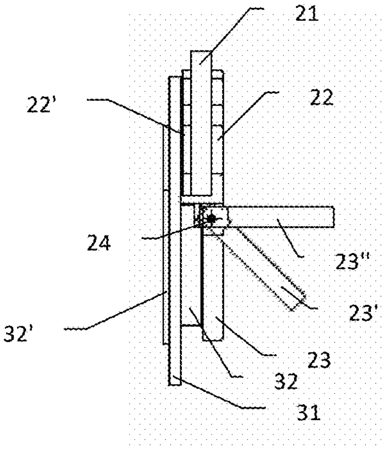
FIG. 3*a* represents a side view of the preferred embodiment of the invention with the mobile port represented in possible positions and FIGS. 3*b* to 3*d* shows side cut views according to the plane A-A, B-B and C-C of FIG. 2.
Figure 3B:
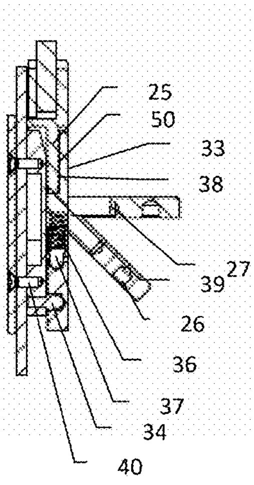
Figure 3C:
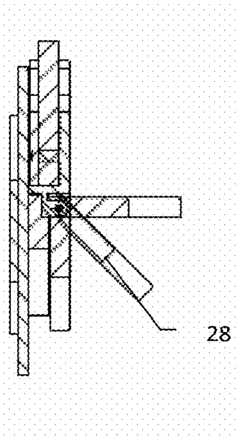
Figure 3D:
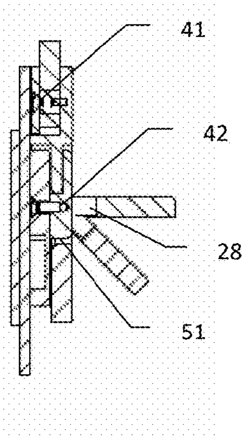

FIGS. 1*a* to 1*c* show isometric views of a preferred embodiment of the invention in three different positions.

FIG. 1*a* represents the preferred embodiment of the invention in what will be called the "locked position", FIG. 1*b* represents the preferred embodiment of the invention in what will be called the "intermediary position" and FIG. 1*c* represents the preferred embodiment of the invention in what will be called the "open position".

It must be noted that the intermediary position in FIG. 1*b* is given as an example here only, since the intermediary position can correspond to any position between the locked position and the open position.

In these figures, we can see the handbag clasp 1 according to the preferred embodiment of the present invention which comprises a first and a second clasping elements 2 and 3.

The first clasping element 2 comprises a first fixed part 22 which is preferably attached to the handbag flap 21 and a mobile part 23 attached to the first fixed part 22 preferably through a hinge. The preferred embodiment presents the first fixed part 22 directly attached to the flap 21 with screws 41 with a counter element 22' (shown in FIGS. 3*a*-3*d*). It has however to be noted that any type of fixing means can be used, such as glue, pins, or the like, and that it can also be indirectly attached to the flap 21, for example through an intermediary element which can, for example, be a magnetic element or an ornamental element, and the like.

The mobile part 23 is movably attached to the first fixed part 22 with a hinge 24 and can be rotated along a rotation axis which is transversal, preferably perpendicular, to the flapping direction of the flap 21.

As shown in the figures, according to the preferred embodiment of the invention the mobile part 23 can be moved from a "locked position" represented in FIG. 1*a* where it is substantially parallel to the first fixed part 22, to an "open position" represented in FIG. 1*c* where it is substantially perpendicular to the first fixed part 22, therefore the angle of movement is approximately 90° between these two positions This is the preferred embodiment because in open position, the mobile part can be used as a handle for the flap which his very useful.

The first fixed part 22 comprises a tongue portion located on its lower edge and presenting a first abutting surface 25 corresponding to the surface facing away the flap 21. It must be noted that the lower edge may present a non-straight profile such that the tongue portion can exceed the lower edge, however this is not represented in the figures.

The mobile part 23 presents an essentially round inner and outer shape, however this is not mandatory since the principle is not directly linked the shape of the elements but rather to the fact that their respective shapes (between the first clasping means 2 and second clasping means 3) are corresponding. The mobile part 23 presents a second abutting surface 28 which his located on its radial inner side and is hingedly fixed to the first fixed part 21 through the rotatable fastening means 24 so as to be moved between the locked position show in FIG. 1*a* and the open position show in FIG. 1*b*.

The second clasping element 3 comprises a second fixed part 32 fixed to the handbag body 31 with screws 40 with a counter element 32' (shown in FIGS. 3*a*-3*d*). This second fixed part 32 is hidden behind the mobile part 23 in FIG. 1*a* and almost entirely in FIG. 1*b* but clearly appears in FIGS. 1*c* and 3*a*-3*d*.

This second fixed part 32 is collaborating with a locking portion 33 to present a recess 35 between them, adapted to receive the tongue portion. It has to be noted that in the preferred embodiment the second fixed part 32 and the locking portion 33 are two different components fixed to each other with a screw 42 to permit modularity, however, as an alternative these two elements may constitute a unitary monobloc component.

The locking portion 33 presents a third abutting portion 38 on its rear side, i.e., the side facing the fixed part 32, which is adapted, once in locked position, to be in contact with the first abutting surface 25 of the tongue portion to prevent relative moment of the two clasping elements 2 and 3 in a direction transversal, preferably perpendicular, to the contact zone or plane 50 between the first and the third abutting surfaces.

Furthermore, the locking portion 33 also presents a fourth abutting portion 39 on its outer radial side, which is adapted, once in locked position, to be in contact with the second abutting surface 28 of the mobile part 23 to prevent relative moment of the two clasping elements 2 and 3 in any direction with the contact zone or plane 51 between the fourth and the second abutting surfaces.

According to the preferred embodiment of the present invention, the outer shape of the locking portion 33 and the inner shape of the mobile part 33 and the fixed part 32 are corresponding shapes and as shown in the figures, this shape is a circle shape, but any shape can be chosen provided that the outer shape of the locking portion 33 and the inner shape of the mobile part 23 and the fixed part 32 correspond so as to permit contact and/or abutting relation between at least a portion of the outer radial shape of the locking portion 33, preferably the lower half, and the inner radial surface 2 of the mobile part 23.

Thanks to the above, when the two clasping means 2 and 3 are in the locked position, they may not move relatively to each other, or only within a few distance if the sizes of the different component permit a gap between the abutting surfaces, said gap being obviously limited to a distance preventing detachment in the locked position.

A further aspect of the invention relates to the presence of a protrusion 34 on the front surface of the second fixed element 32, i.e., the surface facing away the handbag, and in a corresponding recess 26 on the rear surface of the mobile part 23 of the first clasping element 2 positioned such that upon locking position the protrusion 34 is adapted to be received int said recess 26 to further prevent lateral displacement. In the figures only one such protrusion 34 is represented centrally, however, there may be a plurality of them without any symmetry needed. Also, alternatively, the protrusion 34 may be provided on the mobile part 23 and the recess 26 on the second fixed part 32.

Another further aspect of the invention is the presence of an elastic locking means provided on the locking element 33. This locking means preferably has the form of pin 37 mounted on a spring 36 inside the locking element 33 so as to slightly exceed from the lower half radial surface of the locking element. Correspondingly, the inner radial surface of the mobile part 23 comprises a corresponding recess 27 to receive said pin 37 when in locked position. Preferably the pin has a chamfered shape to facilitate engagement/disengagement in/from the recess.

The invention claimed is:

1. A handbag clasp comprising a first clasping element provided on either one of a handbag flap and a handbag body and a second clasping element provided on the other one of the handbag flap and the handbag body and adapted to collaborate together to lock/unlock the handbag clasp in order to permit closing/opening of the handbag, wherein, the first clasping element comprises a first fixed part and a mobile part, the first fixed part comprising a first abutting portion and the mobile part presenting a second abutting portion and being hingedly fixed to the first fixed part so as to be moved between a first unlocking position and a second locking position, the second clasping element comprises a second fixed part and a locking element providing a recess between them, wherein the recess is defined by a surface of the locking element facing away from the handbag body and a surface of the second fixed portion facing the handbag body, and the recess is adapted to receive the first abutting portion and presents a third abutting portion adapted to come in contact with the first abutting portion along a first contact zone and a surface of the first fixed part facing the handbag body when the mobile part is positioned in the locking position, and the locking element presenting a fourth abutting portion adapted to be in contact with the second abutting portion along a second contact zone when the mobile part is positioned in the locking element, characterized in that the first contact zone between the first abutting portion and the third abutting portion is transversal to the second contact zone between the second abutting portion and the fourth abutting portion.

2. The handbag clasp according to claim 1, characterized in that the first contact zone is perpendicular to the second contact zone.

3. The handbag clasp to claim 1, characterized in that one of the second fixed part and the mobile part comprises at least protrusion and the other one of the second fixed part and the mobile part comprises at least one recess positioned such that upon locking position the at least one protrusion is adapted to be received in said at least one recess.

4. The handbag clasp according to claim 1, characterized in that the first fixed part and mobile part presents a predetermined inner radial shape and the locking element presents an outer radial shape fitting said predetermined inner radial shape.

5. The handbag clasp according to claim 4, characterized in that said predetermined inner radial shape is a circle.

6. The handbag clasp according to claim 1, characterized in that the mobile part is hingedly fixed to the first fixed part so as to be rotated between the first unlocking position and the second locking position along a rotation axis transversal to the flapping direction.

7. The handbag clasp according to claim 1, characterized in that the second fixed part and the locking element are a monobloc element.

8. The handbag clasp according to claim 1, characterized in that the first abutting portion corresponds to the surface of a tongue portion located on the lower edge of the first fixed portion which faces away the bag.

9. The handbag clasp according to claim 1, characterized in that the second abutting portion corresponds to an inner radial surface of the mobile part.

10. The handbag clasp according to claim 1, characterized in that the third abutting portion corresponds to a rear side facing the second fixed part of the locking element.

11. The handbag clasp according to claim 1, characterized in that the fourth abutting portion corresponds to an outer radial surface of the locking element.

12. The handbag clasp according to claim 1, characterized in that it further comprises an elastic locking means provided on one of the locking element and the mobile part, said elastic locking means having the form of pin mounted on a spring inside the locking element or the mobile part so as to exceed from its radial surface and a corresponding recess for receiving said pin when in locked position on the other one of the locking element and the mobile part.

13. The handbag clasp according to claim 12, characterized in that the pin has a chamfered shape.

* * * * *